US 10,922,690 B2

(12) United States Patent
Ross

(10) Patent No.: US 10,922,690 B2
(45) Date of Patent: Feb. 16, 2021

(54) SYSTEM AND METHOD FOR PURCHASING USING BIOMETRIC AUTHENTICATION

(71) Applicant: David Joseph Ross, Saint Johns, FL (US)

(72) Inventor: David Joseph Ross, Saint Johns, FL (US)

( * ) Notice: Subject to any disclaimer, the term of this patent is extended or adjusted under 35 U.S.C. 154(b) by 660 days.

(21) Appl. No.: 15/688,192

(22) Filed: Aug. 28, 2017

(65) Prior Publication Data

US 2019/0066114 A1 Feb. 28, 2019

(51) Int. Cl.
| | |
|---|---|
| *G06Q 20/40* | (2012.01) |
| *G06Q 20/38* | (2012.01) |
| *G06Q 20/32* | (2012.01) |
| *G06F 21/32* | (2013.01) |
| *G06Q 20/20* | (2012.01) |
| *H04L 29/06* | (2006.01) |

(52) U.S. Cl.
CPC ....... *G06Q 20/40145* (2013.01); *G06F 21/32* (2013.01); *G06Q 20/204* (2013.01); *G06Q 20/322* (2013.01); *G06Q 20/3224* (2013.01); *G06Q 20/3829* (2013.01); *H04L 63/0823* (2013.01)

(58) Field of Classification Search
None
See application file for complete search history.

(56) References Cited

U.S. PATENT DOCUMENTS

| | | | |
|---|---|---|---|
| 8,788,389 B1* | 7/2014 | Fernandes | G06Q 20/382 705/35 |
| 2006/0261152 A1* | 11/2006 | Wong | G06Q 20/10 235/379 |
| 2011/0202466 A1* | 8/2011 | Carter | G06Q 20/20 705/67 |
| 2012/0066107 A1* | 3/2012 | Grajetzki | G06Q 20/04 705/35 |
| 2013/0024377 A1* | 1/2013 | Stong | G06Q 20/10 705/44 |
| 2014/0108197 A1* | 4/2014 | Smith | G06Q 20/3224 705/26.9 |
| 2015/0019424 A1* | 1/2015 | Pourfallah | G06Q 40/02 705/43 |
| 2015/0142666 A1* | 5/2015 | Landrok | G06Q 20/3226 705/67 |
| 2016/0035021 A1* | 2/2016 | Lin | G06Q 40/00 705/35 |

(Continued)

*Primary Examiner* — Scott A Zare
(74) *Attorney, Agent, or Firm* — Coulter Henry

(57) ABSTRACT

A system and method for registration and processing point of sale purchases, billing and transaction requests using biometric authentication is provided. The system is configured such that upon registration of a user token on a mobile device, an associated financial account server is prevented from processing any transaction requests against the associated account without confirmation and receipt of a user token from a server. The system interacts with the mobile device to verify a biometric identifier before transmission of the user token from a server that interacts with a second server of the financial institution associated with the account before processing a transaction request. The system also includes methods to configure multiple point of sale systems at retail locations to communicate and process payment requests through the system.

10 Claims, 2 Drawing Sheets

(56) References Cited

U.S. PATENT DOCUMENTS

2016/0125522 A1* 5/2016 Tang .................... G06Q 40/00
                                                  705/35
2017/0011399 A1* 1/2017 Steinlicht ............ G06Q 20/405

* cited by examiner

SYSTEM AND METHOD FOR PURCHASING USING BIOMETRIC AUTHENTICATION

FIELD OF THE INVENTION

Example embodiments relate to a method for supporting cashless payment using a mobile communication device.

BACKGROUND OF THE INVENTION

Today's consumer financial accounts systems have been significantly affected by fraudulent transaction activity, where a consumer's financial accounts can be subject to fraudulent account transactions without their knowledge. Financial institutions have tried repeatedly to curb these activities by putting in extra security measures in online and credit/debit card transactions, such as longer passwords, encryption and computer chips on credit/debit cards. However, this approach has not eliminated the fact that once a fraudulent transaction has circumvented these measures, the fraudulent transaction will still occur and, at best, be refunded to the consumer at some time after the occurrence of the transaction.

Further, systems in the cashless payment space have methods for carrying out financial transactions using a mobile telephone system. While these methods add additional layers of security, they are not without inherent shortcomings. There, an electronic connection between the point of sale terminal and the mobile telephone network is established. Access to a merchant's payment system is provided via this connection. The user enters or scans a card identifying number into the terminal. An authentication is performed based on the entered card identification number and user-identifying data read from the SIM card of a mobile device. Then, a connection between the point of sale terminal and the payment service provider's payment system is established and the amount to be paid, a confirmation of amount and an approving method of payment are given to the service provider's payment system. While this method has built in security due to the confirmation of the SIM card of the mobile device, if a consumer's card containing the card identifying number has been stolen or cloned, the fraudulent activity can still occur without the consumer's knowledge. Accordingly, it is an object of the present invention to improve the current cashless payment systems by providing a more secure method of performing cashless payment transactions.

SUMMARY OF THE INVENTION

Some example embodiments may enable a method for supporting cashless payment using a mobile communication device, wherein the mobile communication device provides an authentication method and user token which interacts with a mobile application of the mobile communications device for granting access to a lockbox server, the method comprises the steps of: transmitting the user token stored in the mobile communication device's memory to a lockbox server; the lockbox server transmitting commands to the financial institution upon verification of the user token received from the lockbox server to perform processing and payment transfer, if the received user token has been verified and correct. The financial institution, after registration of the user token, will not process any financial requests without receipt of commands from the lockbox server.

In another embodiment a point of sale unit using a communication method, such as a mobile communication device, the mobile communications device receives the user token from the mobile communication device on request of the a merchant's point of sale unit, transmits the user token to a lockbox server or to a point of sale unit for forwarding to the lockbox server, for processing a payment transaction request. This object is further achieved by a computer program product for a cashless payment system using such mobile communication device, wherein the computer program product, when executed by a mobile communications device, performs the aforementioned functions.

This invention is built on the idea to have a mobile based verification system between the retail or merchant services and the financial institution server which simulates vis-a vis the verification function an exchange with the mobile communication network.

The present invention increases the efficiency of the cashless payment system. The cashless payment system does not require its own authentication and authorization algorithm. Further, it is not necessary to handle specific personal identification numbers (PINs) or transaction numbers (TANs). Already existing powerful mechanisms of a mobile communication device are reused to provide identification and authentication without the requirement to use this mobile communication device and establish a bearer connection via this mobile communication network. The invention provides a secure, cost efficient and user friendly authentication of the cashless payment system. Further advantages are achieved by the embodiments of the invention indicated by the dependent claims.

According to an embodiment of the invention, the mobile communications device is connected to a point of sale unit (MERCHANT SERVICES—Point of Sales) via a short-range interface and at least a part of the communication between the mobile communications device and the payment interworking server is carried over this point of sale unit. The short range interface is, for example, a short range radio interface like a Bluetooth interface or an infrared interface. This makes it possible to implement an easy to handle and user friendly payment process: A mobile communications device can remain in the pocket of the user which stands in the neighborhood of the point of sales unit. The amount to be paid, the confirmation of the user and/or the approving of payment by the user can be entered in the point of sales unit, without any user interaction between the mobile communications device and the user. The exchange of a user token can be automatically executed between the merchant services and the mobile communications device via the short range interface. Further, it is also possible that authentication of a transaction may occur at the mobile communications device.

Further, it is also possible that the mobile communications device and the point of sale unit are connected via a long distance communication network and the point of sale unit is formed by an internet-server which provides an electronic shopping experience.

Some advantages are achieved when carrying the whole communication between the mobile communications device and the payment interworking server via the point of sale unit. The point of sale unit has full control over the data flow which increases the security and efficiency of the system. For example, the point of sale unit forwards the user token to the interworking unit solely when the user has confirmed the amount and has approved the payment. This reduces the work load of the payment interaction unit and increases the security of the system.

Further, the method can be easily adapted to different billing systems and seller's needs: It is possible that the point of sale unit initiates the payment when receiving the confirmation message from the lockbox server. Thereby it is possible to combine the method according to the invention with low-price cashing systems. But, it is also possible that the billing system initiates the payment when receiving the confirmation messages from the lockbox server and sends a confirmation to the point of sale unit about this payment. Further advantages are achieved, if this billing system is a billing system of the mobile operator of the mobile communication device. This system charges the user's mobile operator's account when receiving the confirmation message from the lockbox server.

Further, the security of the system can be increased by encrypting the communication between the mobile communications device and the lockbox server. According to a preferred embodiment of the invention, the mobile communications device encrypts the user token before sending it to the point of sale unit and the payment interworking server decrypts the received mobility subscriber identity, when receiving it from the point of sale unit. Thereby, the user token is protected against fraudulent issues.

BRIEF DESCRIPTION OF THE DRAWINGS

These as well as other features and advantages of the invention will be better appreciated by reading the following detailed description of presently preferred exemplary embodiments taken in conjunction with accompanying drawings of which.

Figure 1:
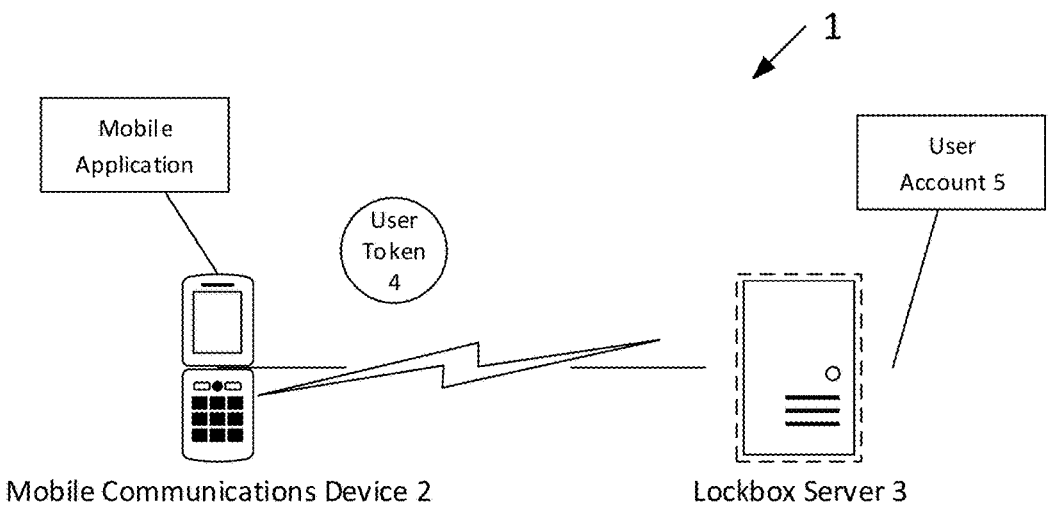
FIG. 1 is a block diagram showing a mobile registration system for creating a cashless payment system having a lockbox server, according to the invention.

The present drawings are not necessarily drawn to scale. Repeat use of reference characters in the present specification and drawings is intended to represent same or analogous features or elements of the invention according to the disclosure.

DESCRIPTION OF THE PREFERRED EMBODIMENTS

Some example embodiments now will be described more fully hereinafter with reference to the accompanying drawings, in which some, but not all, example embodiments are shown. Indeed, the examples described and pictured herein should not be construed as being limiting as to the scope, applicability, or configuration of the present disclosure. Like reference numerals refer to like elements throughout. As used herein, "in communication" should be understood to refer to direct or indirect connection that, in either case, enables functional communication of components that are operably coupled to each other.

Further, the term "or" as used in this disclosure and the appended claims is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Throughout the specification and claims, the following terms take at least the meanings explicitly associated herein, unless the context dictates otherwise. The meanings identified below do not necessarily limit the terms, but merely provided illustrative examples for the terms. The meaning of "a," "an," and "the" may include plural references, and the meaning of "in" may include "in" and "on." The phrase "in one embodiment," as used herein does not necessarily refer to the same embodiment, although it may.

As shown in the accompanying figures, the present invention is directed towards a system and method for accomplishing secure purchases using a mobile device. Additionally, these purchases can be "in person", or preauthorized transactions that are confirmed and completed remotely using a mobile device. Security in this system is established by virtue of only allowing financial transactions to occur against a user's bank account by first authenticating the transaction through the transfer and verification of an authentication token from a user's associated mobile device to a secure lockbox server. The lockbox server will then pass confirmation to the merchant, the credit card company, issuing bank or like financial institution which already has custodial responsibilities for the financial account or data associated with a given user's financial account. Otherwise, the users' financial account is locked and financial transactions cannot be performed against the account.

More specifically, with reference to FIG. 1, the system and attendant method is instigated by the user creating a secure user token based on a biometric scan performed by the user which is stored for use to create the user token, wherein FIG. 1 depicts a mobile registration system 1 to enable registration and interaction of the mobile communication device 2 with the lockbox server 3 according to this invention. The mobile communication device 2 is formed by a cellular mobile device, for example according to the GSM or UMTS standard (GSM=Global System for Mobile Communication; UMTS=Universal Mobile Telecommunications) or IS-95 or CDMA2000 standard. Such devices communicate with several servers which interact with the mobile communication device 2 for granting the mobile communication device 2 access to a mobile communication network. Exemplary, FIG. 1 shows a GSM based mobile communication device 2 in communication with a lockbox server 3, which is formed by a machine server. This machine server can be configured from a physical server or a virtual server without departing from the scope of this invention.

At the mobile communication device 2, on first use of a mobile application downloaded and stored on the mobile communication device 2, the mobile application will request the user to register the mobile communication device 2 to interact and communicate with the lockbox server 3. This registration process includes first capturing and storing a biometric scanned identifier in the memory of the mobile communications device 2. The user will store a biometric scan of the biometric identifier, such as a finger print, facial or other biometric scan. The biometric identifier can also be an eye scan, a facial recognition scan or any other uniquely scanned feature that is specific to the user. The biometric scanning and storing can be performed by any traditional method, such as image capturing or thin film piezo scanning. The mobile application stores the biometric identifier in the memory of mobile communication device 2. If storage is successful, the mobile application will then associate the mobile device identifiers (any or all of the IMEI, SIM, UCID or device serial number) of the mobile communication device 2 with the stored biometric identifier to create a user token 4. The user token 4 will provide the means for authenticating the mobile communication device 2 for communication with the lockbox server 3. The mobile application will then pass the user token 4 to the lockbox server 3. Each financial account later associated with the user account 5 at the lockbox server 3 will receive a unique token 4 composed of the biometric identifier, the mobile device identifier and financial account information to insure a safe and secure user experience. The user token 4 consolidates all the user's mobile communication device 2 identifiers with the biometric identifiers and financial account information to insure the user token 4 cannot be replicated, duplicated or fraudulently used if their device is lost or stolen. Each user token 4 is unique for each account associated with the mobile communication device 2. This allows the user to store multiple digital debit, credit or check cards from the same or multiple financial institutions and/or utilize the traditional card swipe or chip reading process from the merchant service or retailer's mag-strip reader.

Upon transfer of user token 4 to the lockbox server, the lockbox server 3 will then create a user account 5, based on the user token 4, and the user account 5 is stored in a memory at the lockbox server 3. The user token 4 will provide authentication to the lockbox server 3 that furthers communications being received from the mobile communication device 2 have been verified and are coming from the intended source. All data created, received, transmitted and stored on the lockbox server 3 is encrypted with the (Advanced Encryption Standard) AES, or other suitable encryption methods. Upon device registration and account creation, the lockbox server 3 then passes back to the mobile communication device 2 a successful confirmation that the mobile communication device 2 has been authenticated to then verify, confirm and request financial transactions that will be sent to the user's financial institution, as later described below.

Each time the mobile communication device 2 requests communication with the lockbox server 3 the user token 4 is transmitted to the lockbox server 3, the lockbox server 3 verifies the mobile communication device 2 by comparing the transmitted user token 4 with the user token 4 previously stored and the user account 5 on the lockbox server 3. If the signed result is correct, the lockbox server 3 grants access to the mobile communication device 2 and its mobile application to authenticate, submit or request a transaction.

The lockbox server 3 can store multiple different user tokens 4 associated with financial accounts authenticated for the mobile communication device 2. Accordingly, a single user may authenticate financial transactions for multiple financial accounts from a single mobile communications devices 2. For example, the user may have business related accounts and personal accounts where different transactions may take place and need to be authorized by the mobile communications device 2. The lockbox server 3 can reside in any location that is accessible by the mobile communication device 2 and the user's financial institution, which includes, but it not limited to the financial entities' physical processing and server location, at a remote secure hosting facility, or a connected cloud server. Regardless of the location selected, the lockbox server 3 has now become the gateway for all of the user's financial institution transaction servers or processors.

The lockbox server 3 is an authentication and processing system of the user of the mobile registration system 1. Now that the user token 4 and the user account 5 having been created, the user of mobile communication device 2, at the mobile application, can now associate bank, credit card institution, or billing agent information with the user account 5. This financial information will then be associated with user token 4 and thus associated with user account 5 at the lockbox server 3. Upon successful storage of the bank credit card and/or billing agent information, the lockbox server 3, now has the ability to lock and unlock, and credit or debit the user's financial account at the user's bank/credit card institution, or billing agent. The lockbox server 3 sends confirmation that a user account 5 has been created on the lockbox server 3 to the user's financial institution associated with the user's financial accounts. The user's financial accounts are then locked from billing and/or transactions from any other source outside of the financial institution unless the transaction has been confirmed through the user account 5 on the lockbox server 3.

Figure 2:
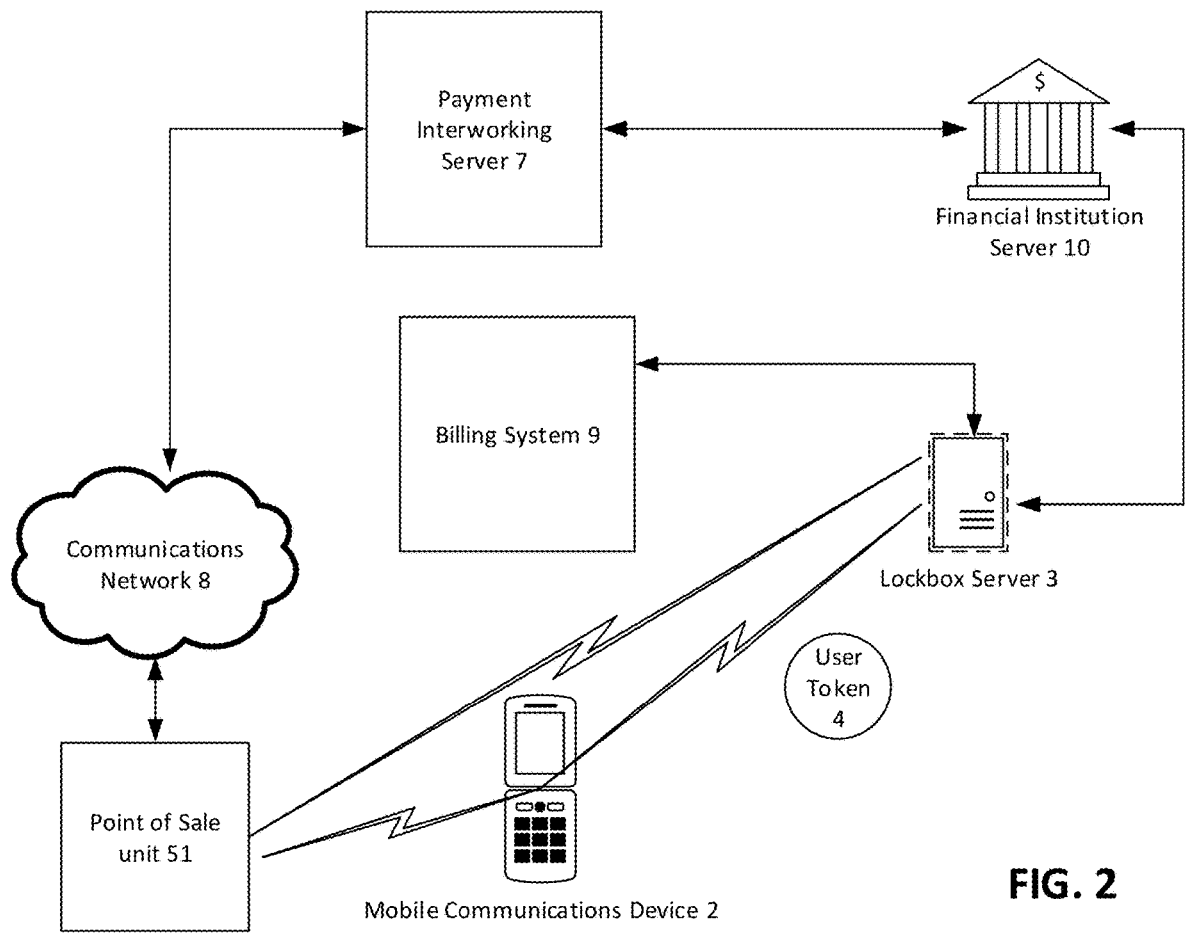
FIG. 2 is a block diagram of an embodiment of the cashless payment system transaction method, according to the invention.

Referring now to FIG. 2, the communications network 8 provides communication between a point of sale unit 51 located at a merchant, and the payment interworking server 7, which may be a cloud based or physically located at the account holder's bank or financial server location server that facilitates transactions, routing and security between the point of sale unit 51 and the financial institution server 10. The communications network 8 provides communication directly from the point of sale unit 51 to the payment interworking server 7, which may be a cloud based or physically located server at the account holder's bank or financial location that facilitates transactions, routing and security between the point of sale unit 51 and the financial institution server 10. The communication between the communication network 8 and the point of sale unit 51 can be achieved by an IP network which may comprise a plurality of different physical interconnected networks using an IP protocol as level three protocol (IP=Internet Protocol). But, it is also possible that the communication from the communication network 8 is a telephone network, for example a PSTN or ISDN network (PSTN=Public Switched Telecommunication Network; ISDN=Integrated Services Digital Network). It is possible that the communication network 8 is a mobile network. Further, it is possible that the communication network 8 is formed by a network providing both kind of services, wherein different services are used for the communication between the point of sale unit 51 and the payment interworking server 7 and between the payment interworking server 7 and the financial institution server 10. The financial institution server 10 may be at any location that houses a user's banking, debiting, credit card or retirement account information.

A direct merchant interface in lieu of point of sale unit 51 can be a cash register, a vending machine, a ticket machine or the like. The direct merchant may also comprise an input and output means, for example a display, a keypad, a microphone, a loudspeaker, a mousepad and so on. Further, the direct merchant interface may comprise a communication unit for communicating via the communication network 8 and a second communication unit for communicating with the mobile communication device 2 via a QR or Barcode scanner, short range interface, or the like. Such a short range interface is, for example, an infrared or short range radio interface like a Bluetooth interface. It is also possible that the second communication unit enables a physical connection between the mobile communications device 2 and the point of sale unit 51. Such galvanic connection is provided by a connector or mobile communication device 2 docking station which allows the data interface of the mobile communications device 2 to receive transaction request information from the direct merchantmerchantmerchant and transmit the authentication and transaction information to the lockbox server 3 to finalize the transaction.

When a user is at the point of sale unit 51 and is ready to initiate a transaction, the amount to be paid is, for example, may be entered by the shop keeper or cashier, scanned or communicated via short wave to the point of sale unit 51. The user may then use a payment device, such as a credit or debit card to begin the transaction, by swiping the card or using a short range interface when a wallet pay application or the like is used instead of a physical card. Alternatively, the user may communicate the transaction direct from the merchant to the Lockbox server 3 or to the point of sale unit 51 using the mobile application. When the card is swiped or input directly to the point of sale unit 51 or at the point of sale unit 51 from a short range interface using the mobile application, the user's account information is captured by the point of sale unit 51. The lockbox server 3 receives the amount to be paid and the user's account information and validates the amount to be paid with the mobile communication device 2 for authorization to unlock the account for deduction and lock the account upon completing the transaction. Should the merchant use their point of sale unit 51, the point of sale unit 51 then transmits the amount to be paid and the user's account information to the lockbox server 3. The lockbox server 3 recognizes the account information transmitted from the point of sale unit 51 and associates the account information with the appropriate user account 5 (as described and created in FIG. 1). The lockbox server 3 then verifies the appropriate token 4 associated with the user account 5 and transmits a payment confirmation to the mobile communications device 2. The user token 4 transmitted from the lockbox server 3 and the token previously stored on the mobile communications device 2 are compared and confirmed. This process confirms that the mobile communication device 2 is the correct device and correct user to approve the transaction.

Upon confirmation of the user token 4, the mobile communication device 2 via the mobile application displays the amount to be paid, asking the user to confirm the amount and approving the payment. The user may then need to provide a biometric scan of their biometric identifier. As previously mentioned with respect to FIG. 1, the biometric identifier can be a finger print scan, eye scan, facial recognition or any other uniquely scanned feature of the user. When using the biometric identifier as the approval for the transaction, the biometric identifier is compared with the biometric identifier associated with the user token 4. Upon successful confirmation, the lockbox server 3 then temporarily unlocks the user's appropriate financial account at the financial institution server 10 until the payment transaction request from the appropriate merchant services device 10 sends the authenticated transaction. When the user gives the appropriate approval, the lockbox server 3 sends the confirmation of payment directly to the merchant (if using lockbox authentication/processing server directly) and the User is issued a receipt for confirmation of payment from the merchant. If the merchant is using the point of sale unit 51 instead of the lockbox server 3 directly, then the transaction protocol is as follows: The point of sale unit 51 sends the received payment data indicating financial transaction request via the communications network 8 to the payment interworking server 7. Such payment data contains, for example, the amount to be paid, the kind of billing system which shall be used for the financial transaction and data identifying an account of the merchant and the amount to be transferred. The payment interworking server 7 connects with the financial institution server 10 to process the transaction from the user's financial account. Once the financial institution server 10 processes the transaction, the payment interworking server 7 sends confirmation back to the point of sale unit 51 through the communications network 8, the point of sale unit 51 can then send the confirmation to the lockbox server 3 that the transaction has been processed and completed. Then the lockbox server 3 will communicate with the user's financial institution server 10 to lock the user's financial account again.

Further, it is possible that the user can use a mobile pay system, such as Apple Pay™, Intuit GoPayment™, PayPal™, etc. in lieu of swiping a physical debit/credit card. There, the payment processing will work in a similar manner. Using a mobile pay system, will require that the mobile payment system, resident on the mobile communication device 2, send the appropriate debit/credit card information directly to the point of sale unit 51, as currently known in the art. From there, the payment processing will proceed as described above.

In an alternate embodiment, it is possible that the user enters approval directly into the point of sale unit 51. According to this embodiment, the mobile communication device 2 can remain in the pocket of the user who stands in close proximity to the point of sale unit 51. The amount to be paid, the confirmation of the user and/or the approval of payment by the user can be entered at the point of sale unit 51, without any user interaction between the mobile communication device 2 and the user. The exchange of the user token 4 can be automatically executed between the point of sale unit 51 and the mobile communication device 2 via the short range interface. The user token 4 is temporarily stored on the point of sale unit 51 until the transaction is completed. The short range interface may be a Bluetooth interface and the Bluetooth paring mechanism is used for establishing this communication. Here, upon completion of the temporary transfer of the user token 4 to the point of sale unit 51, the point of sale unit 51 will send the user token 4 to the lockbox server 3 to be authenticated as the point of communication and confirmation for the financial transaction requests. As mentioned above with respect to previous embodiments, a hand shake and confirmation of the point of sale unit 51 for communication with the lockbox server 3 occurs. The lockbox server 3 recognizes the account information transmitted from the point of sale unit 51 and associates the account information with the appropriate user account 5 (as described and created in FIG. 1). This process confirms that the point of sale unit 51 is the correct device to approve the transaction. To ensure safe keeping of the user token 4, upon completion of processing the transaction request, the point of sale unit 51 deletes the user token 4.

Upon user token 4 confirmation, the point of sale unit 51 displays the amount to be paid, asking the user to confirm the amount and approving the payment. The user will then need to provide a biometric scan of their biometric identifier at the point of sale unit 51. The biometric identifier is compared with the biometric identifier associated with the user token 4. Upon successful confirmation, the lockbox server 3 then temporarily unlocks the user's appropriate financial account at the financial institution until the payment request from the appropriate merchant sends the authenticated transaction. When the user gives his approval, the lockbox server 3 sends the confirmation to the point of sale unit 51 that the transaction is ready to be processed. The point of sale unit 51 sends the received payment data describing the financial transaction via the communications network 8 to the payment interworking server 7. The payment interworking server 7 connects with the user's financial institution server 10 to process the transaction from the user's financial account. Once the payment interworking server 7 processes the transaction, the payment interworking server sends confirmation and confirmation is sent back to the point of sale unit 51 through the communications network 8, the point of sale unit 51 can then sent send the confirmation to the lockbox server 3 that the transaction has been processed and completed. Then the lockbox server 3 will communicate with the financial institution server 10 to lock the user's financial account again.

The system according to FIG. 2 also depicts a method for processing automatic billing transactions through the lockbox server 3. On the mobile communications device 2, a user can schedule payments such as a car or bill payment and specify the date and time at which to process the payment. A traditional method may be used to schedule the payment in the mobile communications device 2 by entering the appropriate account number associated with the car or bill payment, the amount to process and the date on which the transaction should be processed. Once the user payment has been scheduled, the mobile communications device 2 will save the information in its memory for processing on the specified date. This information is also transferred to lockbox server 3 and stored into memory for processing.

On the day and time scheduled for the payment, mobile application will make a transaction request to the mobile communications device 2. The user of the mobile communications device 2 will authenticate the transaction in the same manner as described above by inputting the appropriate biometric scan. Upon successful comparison of the biometric scan to the user token 4, the lockbox server 3 sends communication to the financial institution server 10 to unlock the user's financial account and process the transaction request. At the time of request from the lockbox server 3, the lockbox server 3 will transfer an authentication to the financial institution server 10 to verify that the authentication matches the user's financial account. Upon successful match, the financial institution server 10 will then unlock the account for processing the transaction request. The payment funds will then be deducted from the account. The account is then locked again, upon successful completion; the bank transfers the confirmation to the lockbox server 3. The lockbox server 3 then sends the payment amount to the billing system 9 which pays the appropriate account associated with the previously scheduled payment. The lockbox server 3 then generate a notification that the payment was successfully processed and communicate a receipt or confirmation to the user. Should the user token 4 be denied, the lockbox server 3 immediately requests the financial account be locked and will collect all information details and store on the server and pass along a notification to the mobile communications device 2. All payment requests and details about the processing are stored on the lockbox server 3 and can be view/retrieved on the mobile communications device 2 from the mobile application.

Figure 3:
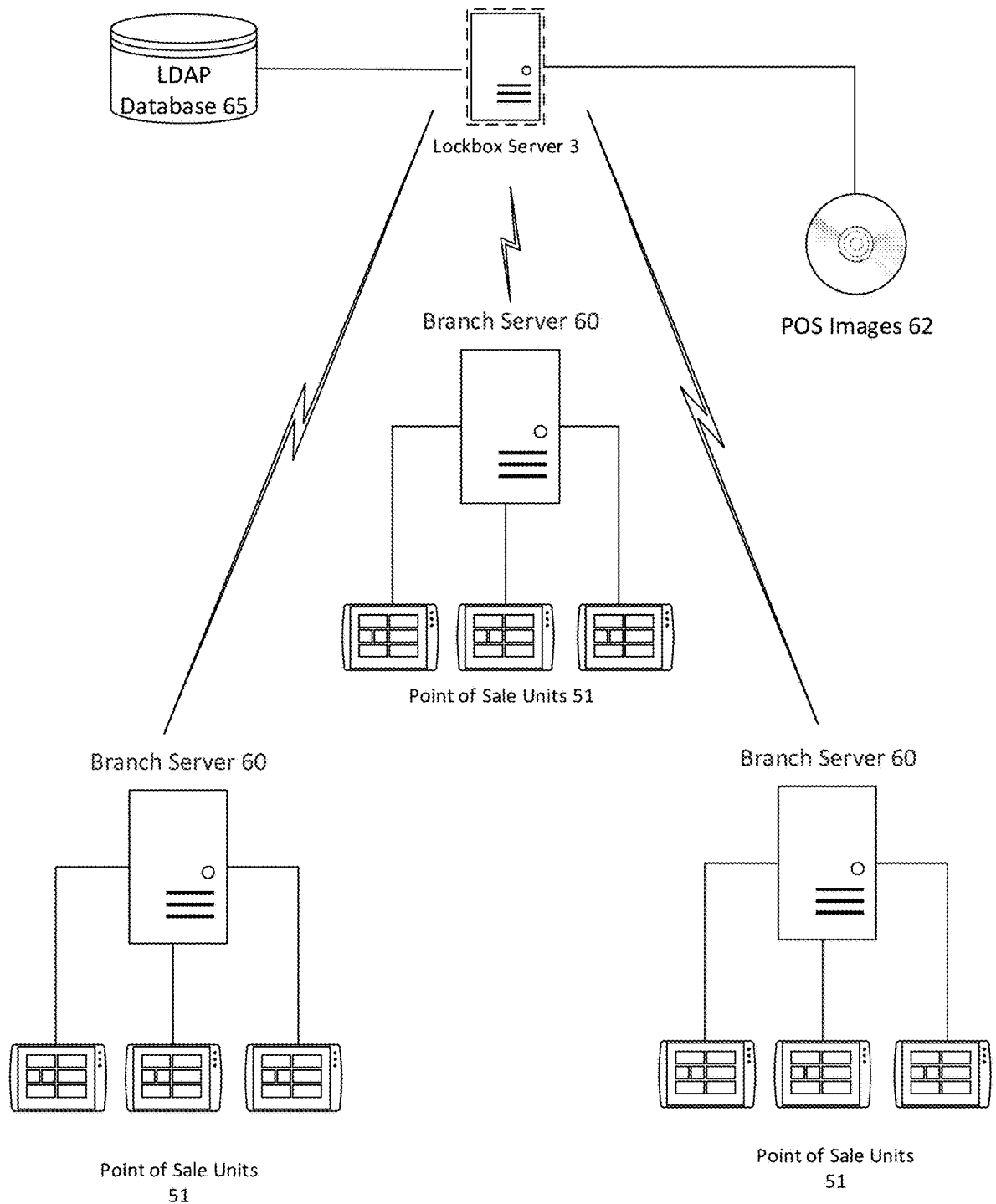
FIG. 3 is an alternate embodiment of the lockbox server as it is used in a typical retail enterprise configuration.

As shown in FIG. 3, an alternate embodiment of the lockbox server 3 as it is used in a typical retail enterprise configuration is shown. The system according to FIG. 3 contains the lockbox server 3 in communication with an LDAP database 65, and POS (Point of Sale) Images 62. The LDAP database 65 is an open, vendor-neutral, industry standard application protocol for accessing and maintaining distributed retail information for services over the system of FIG. 3. The LDAP database 65 contains information to facilitate communication between the point of sale units 51 and the lockbox server 3 or directly from the point of sale units 51 to the lockbox server 3. As examples, the LDAP database 65 may provide any organized set of records, often with a hierarchical structure, containing the authorized point of sale units 51 that are capable of communicating with the lockbox server 3. The POS images 62 contain account, routing and transaction information for each of the retail enterprise's financial accounts. The lockbox server 3 is also in communication with one or more branch servers 60. The branch servers 60 are housed within the retailer's system network, such that the retailer's point of sale system is routes transactional details within the retailer's financial system. The branch servers 60 are also in communication with every point of sale unit 51 and if the merchant uses a third party merchant service provider, to the merchant devices. As described above with respect to FIGS. 1 and 2, the point of sale units 51 capture point of sale details such as a good being purchased, costs, aggregate amounts of the total transaction and the appropriate approvals for unlocking, and debiting a user's financial account.

In accordance with this embodiment, the lockbox server 3 securely enables transactions from the point of sale units 51 to a user's financial institution as discussed above. To enable secure transactions and to establish communication between the lockbox server 3 and the mobile communications units 51, the lockbox server 3 will initially provide a mass download to each branch server 60 with instructions to enable embedded code distribution to all point of sale units 51 and merchant servers on its respective network. The embedded code will allow an input device, at the point of sale units 51, to communicate transactional details, such as prices, items purchased, total amount due from the transaction, etc. to the point of sale units 51. The input device is any traditional piece of computer hardware equipment used to provide data and control signals to the point of sale unit 51. Examples of input devices include keyboards, mouse, scanners, digital cameras and joysticks, etc. After the mass download is complete and the point of sale unit 51 is are operational with the retailer accounting and routing information loaded, the point of sale unit 51 is enabled to communicate with the lockbox server 3 to process transactions. The downloaded and embedded code is standalone and does not compromise or alter the retailer's existing point of sale software platform. The embedded code is utilized to transmit and receive purchased item information from the scanning device to the point of sale unit 51. Once the item information is received at the point of sale unit 51, the point of sale unit 51 captures the user's account information from through any of: use of a payment device, such as a credit or debit card, by swiping the card, or use of a short range interface from the mobile communications device 2 when a pay pass or the like is used instead of a physical card. The user may also communicate account information to the point of sale unit 51 using the mobile application and transmission of the token 4, as described above with respect to FIGS. 1 and 2. As the user's account information is input at the point of sale unit 51, the user's account information is captured by the point of sale unit 51. The point of sale unit 51 then transmits the item information and the user's account to the lockbox server 3. The lockbox server 3, then verifies account information against the user token 4 previously associated with user's account information, as described with respect to FIG. 1. Upon verification, the lockbox server 3 then interacts with the user's financial institution to unlock the user's financial account, send the appropriate transactional details to the user's mobile application for verification of the debit amount. Upon verification, the lockbox server sends instructions to the financial institution to debit the appropriate amount and transfer the payment to the retail enterprise's financial institution based on account information read from the POS images 62. Upon completion of the transaction, the lockbox server 3 sends instruction to lock the user's financial account and sends verification back to the point of sale unit 51 that the transaction has been completed.

Many modifications and other embodiments of the point of sale payment system set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

The invention claimed is:

1. A method for point of sale purchasing using biometric authentication, wherein a mobile communication device having a unique identifier, comprises:
   a processor;
   a display;
   a memory; and
   a mobile application for initiating, by the processor, the provisioning of a user token comprised of at least a biometric identifier, financial account information and the unique identifier, the method comprising the steps of:
   storing the user token in the memory of the mobile communication device; and transmitting the user token to a lockbox server,
   the lockbox server performing the steps of:
      storing the user token;
      retrieving the financial account information from the user token;
      initiating communication with a financial institution server associated with the financial account information; and
      sending commands to the financial institution server to lock a financial account, prevent processing transaction requests associated with the financial account and reroute the transaction requests to the lockbox server.

2. The method of claim 1, wherein the lockbox server:
   receives a confirmation from the financial institution server that the financial account has been locked, any transaction requests associated with the financial account will subsequently be rerouted to the lockbox server; and
   transmits the confirmation to the mobile application.

3. The method of claim 1, wherein upon receipt of a transaction request at the lockbox server, the lockbox server transmits data regarding the transaction request to the mobile application.

4. The method of claim 3, wherein upon receipt of the data regarding the transaction request at the mobile application, the mobile application requests authentication of the transaction request on the display and goes into standby mode until the processor determines that a received biometric identifier and the biometric identifier stored in the user token are identical.

5. The method of claim 4, wherein upon receipt of a biometric identifier at the processor, the processor compares the received biometric identifier with the biometric identifier previously stored in the user token.

6. The method of claim 5, wherein upon confirmation that the received biometric identifier and biometric identifier previously stored in the user token are identical, the processor transmits the user token to the lockbox server.

7. The method of claim 6, wherein upon receipt of the user token at the lockbox server, the lockbox server verifies that the transmitted user token and the user token previously stored in its memory are identical.

8. The method of claim 7, wherein upon verifying that the transmitted user token and the user token previously stored in its memory are identical, the lockbox server initiates commands to the financial institution server to temporarily unlock the financial account associated with the user token and process the transaction request.

9. The method of claim 8, wherein upon receipt of a confirmation that the processing of the transaction request is completed, the lockbox server sends commands to the financial institution server to again lock the financial account to prevent further processing of transaction requests associated with the financial account.

10. The method of claim 3, wherein the transaction request is received at the financial institution server from a billing system.

* * * * *